(12) United States Patent
Oh (10) Patent No.: US 8,953,307 B2
(45) Date of Patent: Feb. 10, 2015

(54) DISPLAY DEVICE

(75) Inventor: Dae-Sung Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 234 days.

(21) Appl. No.: 13/125,226

(22) PCT Filed: Dec. 24, 2008

(86) PCT No.: PCT/KR2008/007654
§ 371 (c)(1),
(2), (4) Date: Apr. 20, 2011

(87) PCT Pub. No.: WO2010/047438
PCT Pub. Date: Apr. 29, 2010

(65) Prior Publication Data
US 2011/0199725 A1    Aug. 18, 2011

(30) Foreign Application Priority Data

Oct. 20, 2008    (KR) ................. 10-2008-0102543

(51) Int. Cl.
*H05K 5/00* (2006.01)
*H05K 7/00* (2006.01)
(Continued)

(52) U.S. Cl.
CPC .............. *H04N 5/64* (2013.01); *Y10S 248/917* (2013.01); *Y10S 248/918* (2013.01); *Y10S 248/92* (2013.01)
USPC ............ 361/679.01; 361/679.02; 361/679.21; 361/679.22; 361/679.24; 361/679.43; 248/917; 248/918; 248/920; 248/81; 348/14.07; 348/177

(58) Field of Classification Search
USPC ............ 361/679.01, 679.02, 679.08, 679.09, 361/679.3, 679.55–679.59; 455/575.1, 455/575.3, 575.4, 575.8, 575.5; 345/156, 345/157, 168, 169, 184; 36/679.01–679.09, 36/679.1–679.19, 679.21–679.29, 36/679.31–679.45, 679.55–679.6, 36/724–747; 248/917–924, 80–88, 248/155.1–155.5, 166–173, 180.1–186.2, 248/229.1–231.51, 271.4, 292.14, 248/316.1–316.8; 348/14.07, 51–52, 177, 348/333.01–333.13, 739; 312/223.1, 223.2, 312/331
See application file for complete search history.

(56) References Cited

U.S. PATENT DOCUMENTS 5,335,100 A    8/1994    Obata ............................. 359/49
6,532,152 B1 *    3/2003    White et al. .................. 361/692
(Continued)

FOREIGN PATENT DOCUMENTS

JP    2004-361664 A    12/2004
JP    2005-070662 A    3/2005
(Continued)

OTHER PUBLICATIONS

International Search Report issued in PCT Application No. PCT/KR2008/007654 dated Mar. 23, 2009.
(Continued)

*Primary Examiner* — Jerry Wu
(74) *Attorney, Agent, or Firm* — Ked & Associates, LLP (57) ABSTRACT

A display device is provided. The display device includes a front panel forming a front exterior of the display device and transmitting images therethrough, a back cover forming a rear exterior of the display device and comprising an edge portion making contact with a backside of the front panel, and a display module accommodated in a space formed by the front panel and the back cover.

10 Claims, 6 Drawing Sheets

(51) Int. Cl.
*A47G 1/10* (2006.01)
*H04N 7/14* (2006.01)
*H04N 17/00* (2006.01)
*H04N 5/64* (2006.01)

(56) References Cited

U.S. PATENT DOCUMENTS

| | | | |
|---|---|---|---|
| 6,747,713 B1 | 6/2004 | Sato | 349/58 |
| 2004/0027498 A1* | 2/2004 | Huber | 348/787 |
| 2006/0091710 A1* | 5/2006 | Zhang et al. | 297/284.1 |
| 2008/0297998 A1 | 12/2008 | Choi | 361/681 |

FOREIGN PATENT DOCUMENTS

| | | |
|---|---|---|
| KR | 20-1999-0032194 | 7/1999 |
| KR | 10-2002-0081744 | 10/2002 |
| KR | 10-2008-0038888 | 5/2008 |

OTHER PUBLICATIONS

European Search Report dated May 8, 2012 issued in Application No. 08 87 7582.

* cited by examiner

DISPLAY DEVICE

CROSS-REFERENCE TO RELATED PATENT APPLICATIONS

This application is a U.S National Stage Application under 35 U.S.C. §371 of PCT Application No. PCT/KR2008/007654, filed Dec. 24, 2008, which claims priority to Korean Patent Application No. 10-2008-0102543, filed Oct. 20, 2008, whose entire disclosures are hereby incorporated by reference.

TECHNICAL FIELD

The present disclosure relates to a display device.

BACKGROUND ART

Generally, display devices are used to display images. Recently, many display devices having a two-dimensional flat shape have been introduced into the market. Such flat display devices occupy less space owing to its small volume and are light and easy-to-handle, thus attracting many customers.

Such a display device may include a display module for displaying images. Examples of the display module include a plasma display module.

The plasma display module is operated by using light emitted from a fluorescent material excited by ultraviolet rays generated by gas-discharging.

In a typical display device, the plasma display module is protected by front and rear cabinets. That is, the front cabinet forms the front exterior of the display device and covers the plasma display module.

DISCLOSURE OF INVENTION

Technical Problem

Embodiments provide a display device that can be manufactured with fewer components and lower costs.

Embodiments also provide a display device having a neat front side and a slim shape.

Technical Solution

In one embodiment, a display device includes: a front panel forming a front exterior of the display device and transmitting images therethrough; a back cover forming a rear exterior of the display device and including an edge portion making contact with a backside of the front panel; and a display module accommodated in a space formed by the front panel and the back cover.

In another embodiment, a display device includes: a front panel forming a front exterior of the display device and transmitting images therethrough; a display module at a backside of the front panel; a back cover forming a rear exterior of the display device and covering the display module; and a grounding member having a first surface making contact with the backside of the front panel and a second surface facing the first surface and making contact with the back cover, so as to ground the front panel and the back cover.

In further another embodiment, a display device includes: a front panel forming a front exterior of the display device and transmitting images therethrough; a display module at a backside of the front panel; a back cover grounded to the front panel and covering the display module; and a coupling member configured to couple the front panel and the back cover.

Advantageous Effects

According to the embodiments, the back cover is in direct contact with the front panel, and the back cover and the package main body are fixed to a supporting member, so that the display device can be manufactured with fewer components and lower costs through fewer processes.

Furthermore, since the front panel forms the entire front exterior of the display device, the front exterior of the display device may seem neat, and the screen of the display device may seem bigger.

In addition, since the back cover is grounded on the front panel through direct contact with the front panel, the number of connections necessary for electric grounding of the display device can be reduced, and thus the grounding efficiency of the display device can be improved.

MODE FOR THE INVENTION

Reference will now be made in detail to the embodiments of the present disclosure, examples of which are illustrated in the accompanying drawings.

Figure 1:
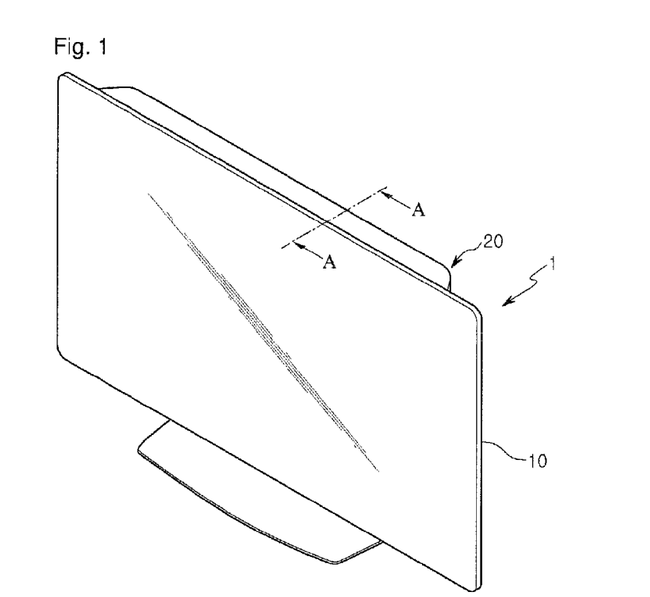
FIG. 1 is a front perspective view illustrating a display device according to a first embodiment.
Figure 2:
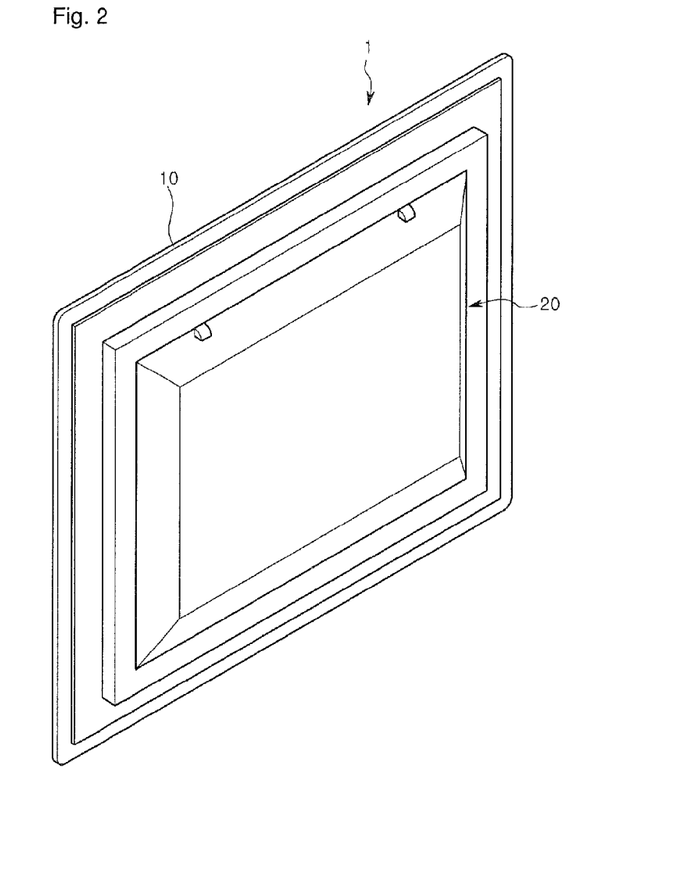
FIG. 2 is a rear perspective view illustrating the display device according to the first embodiment.

FIG. 1 is a front perspective view illustrating a display device according to a first embodiment, and FIG. 2 is a rear perspective view illustrating the display device according to the first embodiment.

Referring to FIGS. 1 and 2, the display device 1 of the current embodiment includes a front panel 10 and a back cover 20. The front panel 10 forms the front exterior of the display device 1, and images are transmitted through the front panel 10. The back cover 20 forms the rear exterior of the display device 1 and makes contact with the backside of the front panel 10. A plasma display module 40 (refer to FIG. 3) is disposed between the front panel 10 and the back cover 20.

In the current embodiment, the front panel 10 and the back cover 20 form the entire exterior of the display device 1.

That is, in the current embodiment, an additional front cabinet is not used to protect the plasma display module 40, and the front panel 10 is configured to form the entire front exterior of the display device 1.

Figure 3:
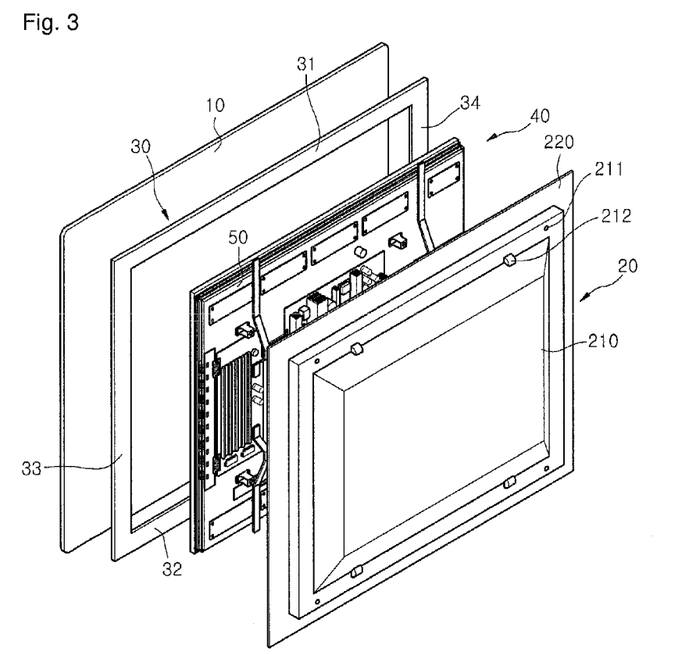
FIG. 3 is an exploded perspective view illustrating the display device according to the first embodiment.
Figure 4:
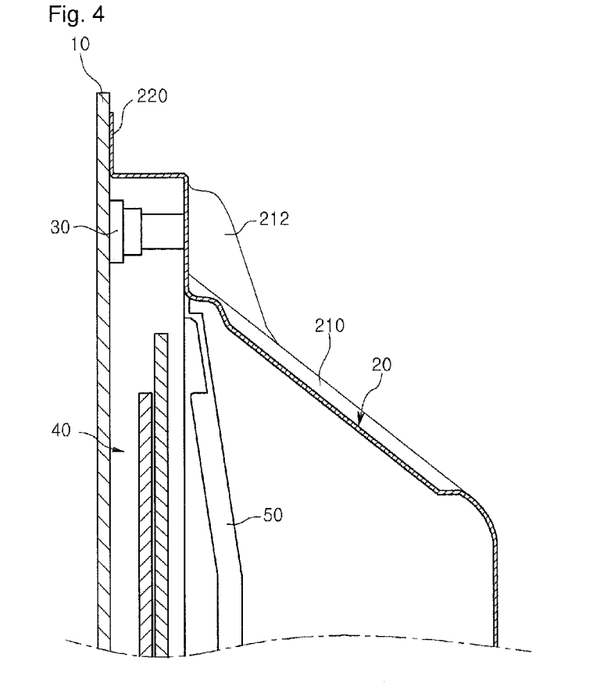
FIG. 4 is a sectional view taken along line A-A of FIG. 1.

FIG. 3 is an exploded perspective view illustrating the display device according to the first embodiment, and FIG. 4 is a sectional view taken along line A-A of FIG. 1.

Referring to FIGS. 3 and 4, the plasma display module 40 is disposed between the front panel 10 and the back cover 20. The plasma display module 40 is coupled to a supporting member 30 fixed to the backside of the front panel 10.

The front panel 10 is formed of glass and is transparent for transmitting images therethrough. The front panel 10 may be formed of toughened glass for satisfying strength requirements of a large display device. However, the front panel 10 can be formed of other materials such as transparent plastic. That is, the front panel 10 can be formed of any materials that are transparent and have allowable strength, and this material modification will be included in the scope of the current embodiment.

A plurality of layers, such as an antireflection layer, an optical characteristic layer, an electromagnetic interference (EMI) cutoff layer, and a near infrared ray (NIR) cutoff layer, may be provided on the front panel 10.

The supporting member 30 includes four members 31, 32, 33, and 34. The four members 31, 32, 33, and 34 may be formed in one piece, or the four members 31, 32, 33, and 34 may be separately formed and then coupled to each other. The supporting member 30 may be fixed to the backside of the front panel 10 by using an adhesive member (not shown) or an adhesive. For example, the adhesive member may be a double-sided tape.

The plasma display module 40 is coupled to the front panel 10 through a connecting member 50. One side of the connecting member 50 is coupled to the plasma display module 40, and the other side of the connecting member 50 is coupled to the supporting member 30.

In a state where the plasma display module 40 is coupled to the supporting member 30, the supporting member 40 is disposed around top, bottom, and lateral sides of the plasma display module 40.

The back cover 20 is formed of a metal and makes direct contact with the backside of the front panel 10. Therefore, the back cover 20 can be directly grounded to the backside of the front panel 10.

Alternatively, the back cover 20 may be configured by a plastic body and a conductive material (e.g., aluminum) coated or attached on the inner surface of the plastic body, and the back cover 20 may be grounded to the front panel 10. That is, in the current embodiment, the back cover 20 can have any structure and be formed of any material as long as the back cover 20 can be grounded to the front panel 10.

The back cover 20 includes a body part 210 forming the exterior of the back cover 20, and an extension part 220 extending from the body part 21 and making contact with the backside of the front panel 10.

The extension part 220 extends outward at four edge portions of the front panel 10, and at least a portion of the extension part 220 faces the backside of the front panel 10. That is, at least a portion of the extension part 22 is flat and parallel with the backside of the front panel 10. The extension part 220 is the outermost end part of the back cover 20.

The back cover 20 may be coupled to the supporting member 30 fixed to the backside of the front panel 10 by using coupling members (not shown). Coupling holes 211 are formed in the body part 210 for receiving the coupling members.

The coupling members may be coupled to the supporting member 30 by inserting the coupling members through the coupling holes 211 of the body part 210 from the back of the back cover 20.

Accommodation parts 212 are formed at the body part 210 for accommodating the connecting member 50 when the back cover 20 is in contact with the backside of the front panel 10, so as to prevent interference between the back cover 20 and the connecting member 50. The accommodation parts 212 are formed by recessing portions of the body part 210 backward.

In a state where the extension part 220 of the back cover 20 is in contact with the backside of the front panel 10, the back cover 20 covers the supporting member 30 and the plasma display module 40. That is, the supporting member 30 is not exposed to the outside.

According to the current embodiment, the back cover 20 is in direct contact with the front panel 10 formed of glass, and the back cover 20 and the plasma display module 40 are fixed to the supporting member 30, so that the display device 1 can be manufactured with fewer components and lower costs through fewer processes.

Furthermore, since the front panel 10 formed of glass forms the entire front exterior of the display device 1, the entire front exterior of the display device 1 is homogeneously flat, so that the front exterior of the display device 1 may seem neat and the screen of the display device 1 may seem bigger.

In addition, since the back cover 20 is grounded on the front panel 10 through direct contact with the front panel 10, the number of connections necessary for electric grounding of the display device 1 can be reduced, and thus the grounding efficiency of the display device 1 can be improved.

Figure 5:
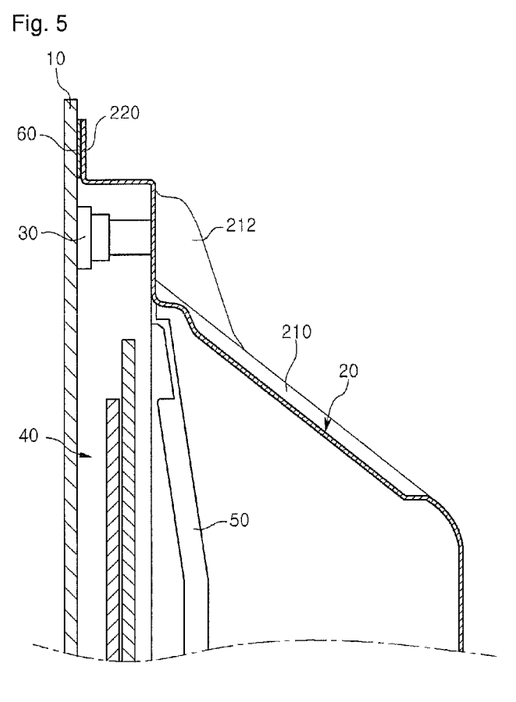
FIG. 5 is a sectional view taken long line A-A of FIG. 1, according to a second embodiment.

FIG. 5 is a sectional view taken long line A-A of FIG. 1, according to a second embodiment.

The current embodiment is the same as the first embodiment except for a grounding member disposed between the front panel and the back cover. Thus, in the following description of the current embodiment, the characteristic part will be only described.

Referring to FIG. 5, in the current embodiment, a grounding member 60 is provided on the backside of the front panel 10. The grounding member 60 is provided at four backside edge portions of the front panel 10. The grounding member 60 may be fixed to the front panel 10 using an adhesive member (e.g., a double-sided tape) or an adhesive.

The grounding member 60 may be formed of a conductive material such as aluminum or copper. The grounding member 60 may be elastic. For example, the grounding member 60 may be configured by an elastic member (e.g., sponge) and a conductive member (e.g., an aluminum member) surrounding the elastic member. Therefore, the back cover 20 can be grounded on the backside of the front panel 10 through the conductive member of the grounding member 60 in a state where the grounding member 60 is elastically movable owing to the elastic member.

That is, in the current embodiment, the back cover 20 is grounded to the backside of the front panel 10 via the grounding member 60.

A first surface of the grounding member 60 is in contact with the backside of the front panel 10, and a second surface of the grounding member 60 opposite to the first surface is in contact with the extension part 220 of the back cover 20.

The distance between the front panel 10 and the extension part 220 is the same as the thickness of the grounding member 60.

In the case where the grounding member 60 is elastic, the extension part 220 of the back cover 20 can be wholly brought into contact with the grounding member 60, and thus the grounding efficiency can be improved.

In the current embodiment, the grounding member 60 is fixed to the backside of the front panel 10; however, the grounding member 60 may be grounded on the backside of the front panel 10 in a state where the grounding member 60 is fixed to the extension part 220 of the back cover 20.

Figure 6:
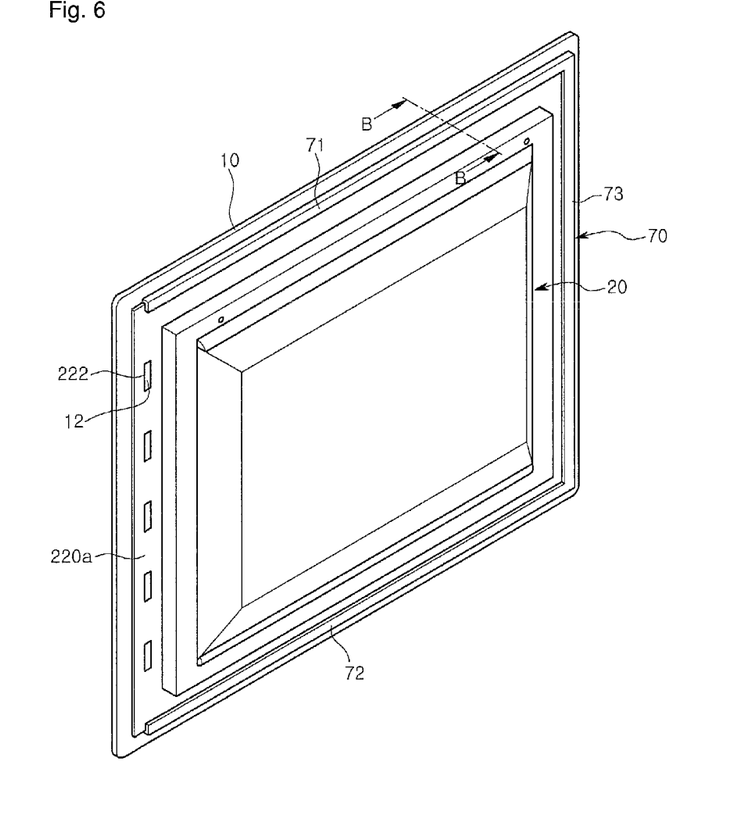
FIG. 6 is a rear perspective view illustrating a display device according to a third embodiment.
Figure 7:
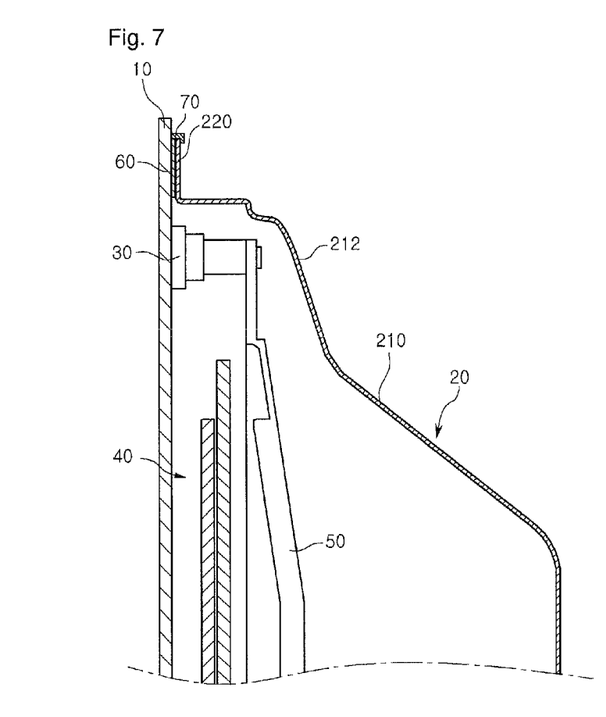
FIG. 7 is a sectional view taken along line B-B of FIG. 6.

FIG. 6 is a rear perspective view illustrating a display device according to a third embodiment, and FIG. 7 is a sectional view taken along line B-B of FIG. 6.

The current embodiment is the same as the first embodiment except for a method of fixing a front panel and a back cover. Thus, in the following description, the characteristic feature will be only described.

Referring to FIGS. 6 and 7, in the current embodiment, a front panel 10 includes a coupling member 70 for coupling with a back cover 20. The coupling member 70 may be fixed to the backside of the front panel 10 by using an adhesive member (not shown) or an adhesive (not shown).

The coupling member 70 includes upper and lower coupling members 71 and 72 disposed at upper and lower backside edge portions of the front panel 10, and a lateral coupling member 73 disposed at a right backside edge portion of the front panel 10 and connected to the upper and lower coupling members 71 and 72. In the current embodiment, the lateral coupling member 73 is disposed at the right backside edge portion of the front panel 10; however, the lateral coupling member 73 may be disposed at a left backside edge portion of the front panel 10.

Each of the coupling members 71, 72, and 73 has an L-shaped section. Therefore, an extension part 220 of the back cover 20 can be coupled to the coupling members 71, 72, and 73 by sliding the extension part 220 of the back cover 20 from left to right on the backside of the front panel 10. When the extension part 220 of the back cover 20 is coupled to the coupling members 71, 72, and 73, two surfaces of the extension part 220, that is, top and rear surfaces of the extension part 220, are surrounded by the coupling members 71, 72, and 73.

A plurality of fixing members 12 are provided on the left backside of the front panel 10 for fixing the back cover 20 coupled to the coupling member 70. The fixing members 12 may be vertically arranged at predetermined intervals and fixed to the backside of the front panel 10 by using an adhesive member or an adhesive.

A plurality of fixing holes 222 are formed in a left extension part 220a of the back cover 20 for receiving the fixing members 12.

Therefore, in a state where the back cover 20 is completely coupled to the coupling members 71, 72, and 73, the fixing members 12 are inserted in the fixing holes 222 so that the position of the back cover 20 can be firmly fixed relative to the front panel 10. When the position of the back cover 20 is fixed relative to the front panel 10, the extension part 220 of the back cover 20 makes contact with the backside of the front panel 10.

In the current embodiment, since the back cover 20 is coupled to the coupling member 70 through a sliding motion, accommodation parts 212 may be formed along the length of the back cover 20 unlike the accommodation parts 212 of the first embodiment.

In the current embodiment, it will be easily understood that the back cover 20 can be supported by the front panel 10 owing to the fixing members 12 and the coupling member 70.

Figure 8:
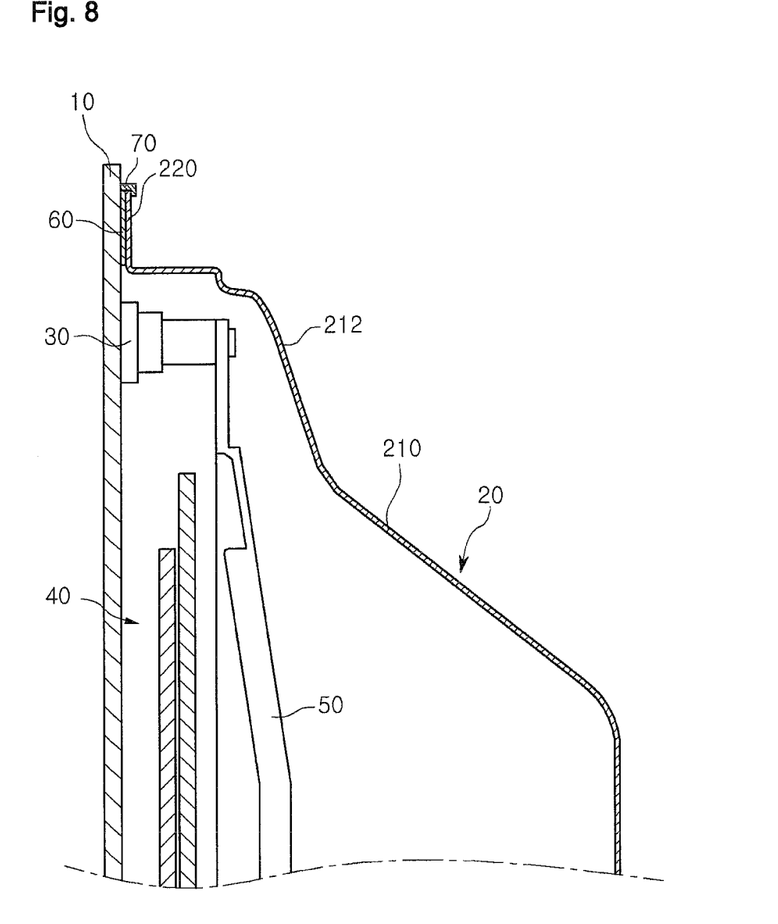
FIG. 8 is a sectional view taken along line B-B of FIG. 6, according to a fourth embodiment.

FIG. 8 is a sectional view taken along line B-B of FIG. 6, according to a fourth embodiment.

The current embodiment is the same as the third embodiment except for a grounding member disposed between the front glass and the back cover. Thus, in the following description of the current embodiment, the characteristic part will be only described.

Referring to FIG. 8, in the current embodiment, a grounding member 60 is provided on the backside of the front panel 10. The grounding member 60 is fixed to four backside edge portions of the front panel 10.

The structure and function of the grounding member 60 are the same as those illustrated in the second embodiment, and thus detailed descriptions thereof will be omitted.

According to the current embodiment, the grounding member 60 is pressed by the extension part 220 of the back cover 20 in a state where the extension part 220 of the back cover 20 is coupled to the coupling members 71, 72, and 73. Therefore, the contact area between the grounding member 60 and the extension part 220 can be increased, and in the case where the grounding member 60 is elastic, the extension part 220 and the coupling members 71, 72, and 73 can be coupled with each other more firmly owing to the resilient force of the grounding member 60.

The invention claimed is:

1. A display device, comprising: a front panel having a front side forming a front exterior of the display device and a back side opposite the front side wherein an entire surface of the back side is parallel to an entire surface of the front side, the front panel transmitting images therethrough;
   a back cover coupled to the back side of the front panel and forming a rear exterior of the display device, the back cover comprising an edge portion that contacts the back side of the front panel; and a display module accommodated in a space formed between the front panel and the back cover, wherein the front panel is formed of a transparent material for transmitting images generated by the display module therethrough; and
   the back cover comprises:
   a body part at least covered an entirety of a rear surface of the display module; and
   an extension part making direct contact with four back side edge portions of the front panel and forming an end portion of the back cover; and
   a supporting member with a first end fixed to a first flat surface of the front panel and a second end fixed to the back cover over a surface which is faced and parallel to the first flat surface; and
   a connecting member located between the display module and the body part and configured to connect the display module to the second end of the supporting member and an edge of the body part;
   wherein the display module includes a front surface that faces the back side of the front panel, wherein the supporting member causes the front panel to space apart from an entirety of the front surface of the display module such that the front surface of the display module does not directly contact the front panel, and the front panel extends entirely across the front surface of the display module such that the display module is not exposed to an outside of the display device.

2. The display device according to claim 1, wherein the back cover surrounds the supporting member in a state where an edge portion of the back cover is in contact with the first flat surface of front panel.

3. The display device according to claim 1, wherein the supporting member is spaced apart from the display module, and at least an edge portion of the display module is surrounded by the supporting member.

4. The display device according to claim 1, wherein the back cover is coupled to the supporting member and covers the supporting member entirely to prevent exposing of the supporting member.

5. The display device according to claim 1, further comprising a coupling member configured to fix the back cover and the front panel.

6. The display device according to claim 5, wherein the coupling member is fixed to the backside of the front panel, and the back cover is coupled to the front panel through a sliding motion.

7. The display device according to claim 1, wherein the front panel is formed of glass or a transparent plastic material.

8. A display device, comprising: a front panel having a front side forming a front exterior surface of the display device, the front panel having a first flat surface transmitting images therethrough, wherein the first flat surface located on a back side opposite the front side wherein an entire surface of the back side is parallel to an entire surface of the front side;

a back cover coupled to the front panel and forming a rear exterior surface of the display device, the back cover comprising an edge portion making direct contact with four back side edge portions of the front panel and forming an end portion of the back cover; a supporter having a first end fixed to the first flat surface of the front panel; and the back cover comprises:

a body part at least covered an entirety of a rear surface of a display module; and the display module accommodated in a space formed between the front panel and the back cover, the display module comprising a front surface that faces the first flat surface of the front panel; and a connecting member located between the display module and the body part and configured to connect the display module to an edge of the body part and a second end of the supporter over a surface of the back cover which is faced and parallel to the first flat surface, wherein the supporter causes the connecting member and the front surface of the display module are spaced apart from the first flat surface of the front panel such that the connecting member and the front surface of the display module do not contact the front panel.

9. The display device according to claim 8, wherein the back cover surrounds the supporter, with the edge portion of the back cover in contact with the first flat surface of front panel.

10. The display device according to claim 8, wherein the back cover further comprises accommodation parts to accommodate the connecting member to prevent interference between the back cover and the connecting member.

* * * * *